(12) United States Patent
He et al.

(10) Patent No.: US 9,640,786 B2
(45) Date of Patent: May 2, 2017

(54) SAFETY CAP ASSEMBLY OF POWER BATTERY

(71) Applicant: Ningde Amperex Technology Limited, Ningde (CN)

(72) Inventors: Mengjiang He, Ningde (CN); Rulai Cai, Ningde (CN); Pinghua Deng, Ningde (CN); Peng Wang, Ningde (CN); Quankun Li, Ningde (CN)

(73) Assignee: NINGDE AMPEREX TECHNOLOGY LIMITED, Ningde (CN)

( * ) Notice: Subject to any disclaimer, the term of this patent is extended or adjusted under 35 U.S.C. 154(b) by 178 days.

(21) Appl. No.: 14/532,704

(22) Filed: Nov. 4, 2014

(65) Prior Publication Data

US 2015/0132619 A1 May 14, 2015

(30) Foreign Application Priority Data

Nov. 11, 2013 (CN) ...................... 2013 2 0706489 U

(51) Int. Cl.
*H01M 2/04* (2006.01)
*H01M 2/12* (2006.01)
*H01M 2/34* (2006.01)

(52) U.S. Cl.
CPC ......... *H01M 2/043* (2013.01); *H01M 2/1223* (2013.01); *H01M 2/34* (2013.01); *H01M 2/04* (2013.01); *H01M 2/12* (2013.01); *H01M 2200/00* (2013.01); *H01M 2220/20* (2013.01)

(58) Field of Classification Search
CPC .......... H01M 2/04; H01M 2/043; H01M 2/12; H01M 2/1223
See application file for complete search history.

(56) References Cited

U.S. PATENT DOCUMENTS

| 2014/0038001 A1* | 2/2014 | Cai ...................... H01M 2/043 429/53 |
| 2014/0193696 A1* | 7/2014 | Kim ...................... H01M 2/202 429/158 |

FOREIGN PATENT DOCUMENTS

CN   202839773 U   3/2013

* cited by examiner

*Primary Examiner* — Stewart Fraser
*Assistant Examiner* — Rachel L Zhang
(74) *Attorney, Agent, or Firm* — Morgan, Lewis & Bockius LLP

(57) ABSTRACT

A safety cap assembly of power battery comprises a cap plate and a first terminal unit, a second terminal unit, a vent, an electrolyte-injection hole and a safety reverse valve provided to the cap plate; the first terminal unit is electrically connected to the cap plate; the second terminal unit is insulated from and assembled to the cap plate; the safety reverse valve is electrically connected to the cap plate; a short circuit protection conducting plate is provided above the cap plate, is electrically connected to the second terminal unit, and is positioned above the safety reverse valve; the first terminal unit comprises a first terminal body, and a metal gasket and a resistance plate around the first terminal body, the resistance plate is provided below the metal gasket and comprises a substrate and a coating on a surface of the substrate.

6 Claims, 3 Drawing Sheets

SAFETY CAP ASSEMBLY OF POWER BATTERY

CROSS-REFERENCE TO RELATED APPLICATIONS

The present application claims priority to Chinese patent application No. 201320706489.5 filed on Nov. 11, 2013, which is incorporated herein by reference in its entirety.

TECHNICAL FIELD OF THE PRESENT DISCLOSURE

The present disclosure relates to the technical field of power batteries, and particularly relates to a safety cap assembly of power battery.

BACKGROUND OF THE PRESENT DISCLOSURE

With development of modern society and people's awareness of environmental protection, more and more equipments use a rechargeable secondary battery as a power source, such as mobile phones, laptops, electrical tools, electrical automobiles and the like, which provides a broad space for application and development of the rechargeable secondary battery.

Generally, the electrical vehicles and energy storage stations need to use a high-capacity power battery as a power source. These power batteries should not only have high capacity, but should also have good safety and long cycle life, so as to reach the use standard and meet people's needs.

To ensure the safety of a power battery to a certain extent, generally a cap assembly of a power battery is provided with a vent. When the power battery has an accident caused by improper charging, short circuit, or exposure to a poor environment such as a high temperature environment, the power battery with high energy will produce a large amount of gas and temperature thereof will rise sharply, the gas bursts through the vent to release pressure, existence of the vent greatly improves safety performance of the power battery. The presence of the vent can improve the safety performance of the power battery to some extent, but if the energy gathered by the battery itself which is involved in the accident is not released, the power battery itself becomes a potential dangerous resource and there are still some safety problems left, if the power battery continues to be overcharged after involving the accident, more serious safety accidents will be caused.

A technical solution to solve the above problems is disclosed in the Chinese patent ZL201220419624.3, in which a resistance plate is additionally provided, and the resistance plate is provided in an insulating body, when an external short circuit of the battery occurs, a current of the external short circuit is controlled by the resistance plate, so as to protect the safety of a safety reverse valve and a short circuit protection conducting plate. For now, the structure in the above patent is complex, and the effect is not perfect when only the resistance plate is provided to control the current of the external short circuit.

SUMMARY OF THE PRESENT DISCLOSURE

In view of the deficiencies in the existing technology, an object of the present disclosure is to provide a safety cap assembly of power battery, the cap assembly is provided with a coating having a high electrical resistivity and a high melting point, when an external short circuit occurs, a circuit current is controlled by controlling a circuit resistance, so as to protect the safety of the safety reverse valve and the short circuit protection conducting plate, and further improve the safety performance of the power battery; and the present disclosure has a simple structure and high practicability.

In order to achieve the above object, the present disclosure provides a safety cap assembly of power battery which comprises a cap plate and a first terminal unit, a second terminal unit, a vent, an electrolyte-injection hole and a safety reverse valve which are provided to the cap plate; the first terminal unit is electrically connected to the cap plate; the second terminal unit is insulated from and assembled to the cap plate; the safety reverse valve is electrically connected to the cap plate; a short circuit protection conducting plate is provided above the cap plate, the short circuit protection conducting plate is electrically connected to the second terminal unit, the short circuit protection conducting plate is positioned above the safety reverse valve; the first terminal unit comprises a first terminal body, and a metal gasket and a resistance plate which are provided around the first terminal body, the resistance plate is provided below the metal gasket, the resistance plate comprises a substrate and a coating on a surface of the substrate. The substrate of the resistance plate can be provided by metal stamping or machining and other methods, the coating on the surface of the substrate can be provided by dipping, spraying or blade coating.

In an embodiment of the safety cap assembly of power battery of the present disclosure, the resistance plate is positioned between the first terminal body and the cap plate, and the first terminal body is electrically connected to the cap plate via the resistance plate.

In an embodiment of the safety cap assembly of power battery of the present disclosure, a shape of the resistance plate is provided as a square, a circle or an ellipse.

In an embodiment of the safety cap assembly of power battery of the present disclosure, a thickness of the coating is 150 µm~400 µm.

In an embodiment of the safety cap assembly of power battery of the present disclosure, the thickness of the coating is 200 µm~300 µm.

In an embodiment of the safety cap assembly of power battery of the present disclosure, one end of the short circuit protection conductive piece is welded with, riveted with, screwed with or adhered with the cap plate, the other end of the short circuit protection conductive piece is welded with, riveted with, screwed with or adhered with the second terminal unit.

In an embodiment of the safety cap assembly of power battery of the present disclosure, the safety reverse valve is welded with the cap plate.

In an embodiment of the safety cap assembly of power battery of the present disclosure, the safety reverse valve is provided with a notch, a depth of the notch is 0.05 mm~2 mm.

The present disclosure has the following beneficial effects: in the present disclosure, the resistance plate is additionally provided in the cap assembly, and the resistance plate comprises a coating having a high electrical resistivity and a high melting point, when an external short circuit is involved, the circuit current is controlled by controlling the circuit resistance, so as to protect the safety of the safety reverse valve and the short circuit protection conducting plate, overcharging is effectively prevented after the power battery is involved in an accident, and the internal energy of the battery involved in the accident is released, so as to further improve the safety performance of the power battery; the present disclosure can improve the safety performance of the power battery only by providing the coating on the substrate, but the resistance plate needs to be provided in the insulating body in the prior art, which shows the present disclosure has a simple structure and high practicability.

Figure 1:
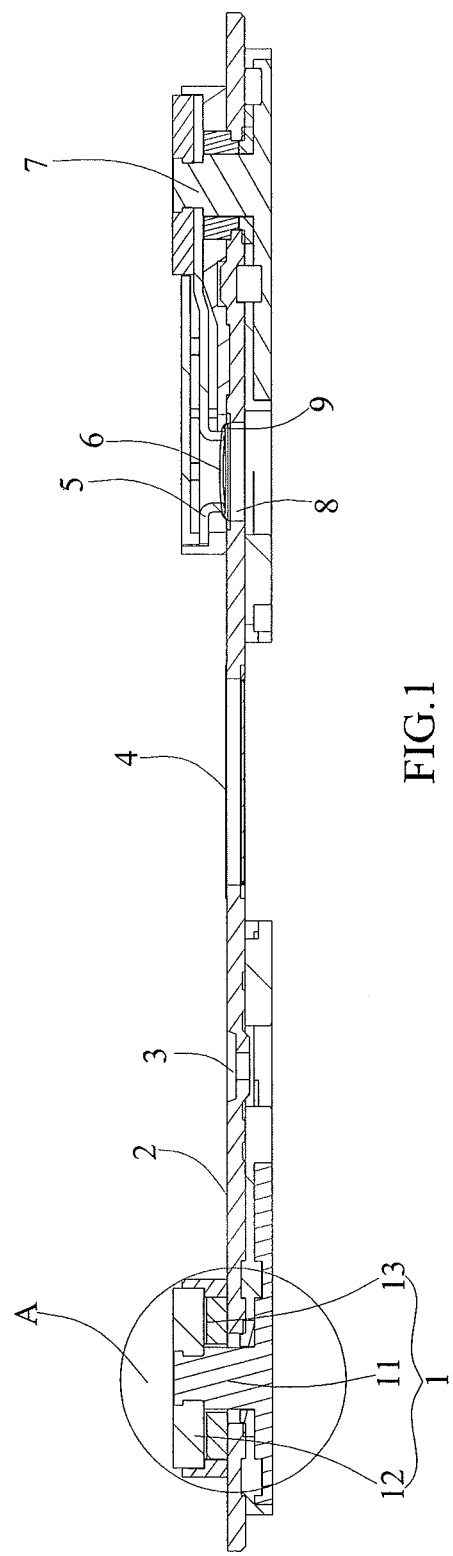
FIG. 1 is a schematic structural view of the present disclosure.

Reference numerals of the embodiments are represented as follows:
1 first terminal unit
2 cap plate
3 electrolyte-injection hole
4 vent
5 short circuit protection conducting plate
6 safety reverse valve
7 second terminal unit
8 hole
9 notch
11 first terminal body
12 metal gasket
13 resistance plate
14 substrate
15 coating

DETAILED DESCRIPTION

Hereinafter the present disclosure will be described in detail in combination with specific embodiments and drawings, but the present disclosure is not limited to these embodiments.

Figure 2:
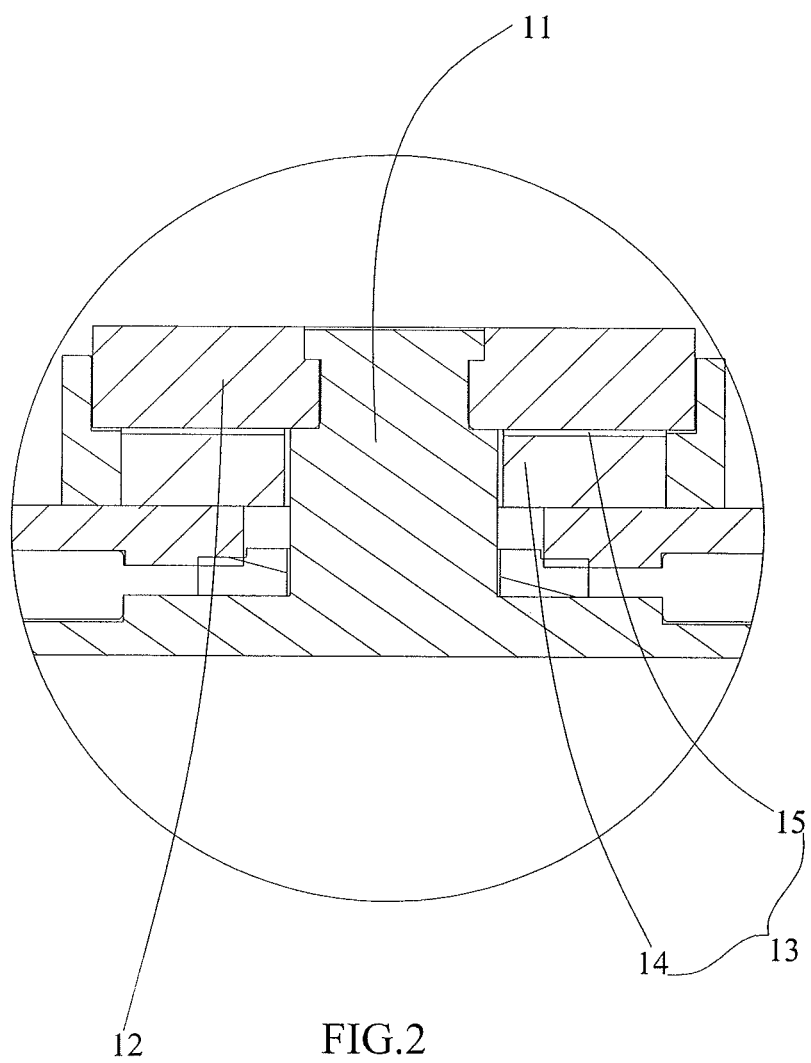
FIG. 2 is an enlarged view of the A portion of FIG. 1.
Figure 3:
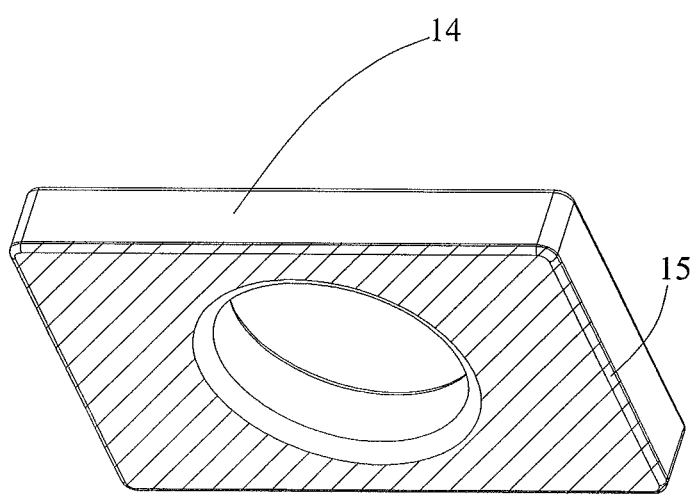
FIG. 3 is a schematic view of a resistance plate of the present disclosure.

As shown in FIGS. 1-3, a safety cap assembly of power battery comprises a cap plate 2 and a first terminal unit 1, a second terminal unit 7, a vent 4, an electrolyte-injection hole 3 and a safety reverse valve 6 which are provided to the cap plate 2; the first terminal unit 1 is electrically connected to the cap plate 2; the second terminal unit 7 is insulated from and assembled to the cap plate 2; the safety reverse valve 6 is electrically connected to the cap plate 2; a short circuit protection conducting plate 5 is provided above the cap plate 2, the short circuit protection conducting plate 5 is electrically connected to the second terminal unit 7, the short circuit protection conducting plate 5 is positioned above the safety reverse valve 6; the safety reverse valve 6 and the short circuit protection conducting plate 5 should adopt a material having a high melting point, such as copper or iron and the like; the first terminal unit 1 comprises a first terminal body 11, and a metal gasket 12 and a resistance plate 13 which are provided around the first terminal body 11, the resistance plate 13 is provided below the metal gasket 12, a shape of the resistance plate 13 is provided as a square, the resistance plate 13 comprises a substrate 14 and a coating 15 on the surface of the substrate 14, a resistance of the resistance plate 13 can be adjusted by the composition and thickness of the material of the substrate 14 and the coating 15, the substrate 14 generally adopts an iron-chromium-aluminum alloy or stainless steel, the coating 15 generally adopts a high temperature-resistance composite material comprising inorganic and organic polymers.

The resistance plate 13 is positioned between the first terminal body 11 and the cap plate 2, and the first terminal body 11 is electrically connected to the cap plate 2 via the resistance plate 13. The shape of the resistance plate 13 can also be provided as a circle or an ellipse.

Preferably, a thickness of the coating 15 is 150 μm~400 μm.

More preferably, the thickness of the coating 15 is 200 μm~300 μm, when the power battery is involved in an external short circuit, the resistance of the resistance plate 13 can reach a pre-designed range of 50 mohm~130 mohm at this thickness, so as to ensure the circuit resistance to stabilize in a certain range, and allow the circuit current controllable, ultimately the safety reverse valve 6 and the short circuit protection conducting plate 5 are protected.

One end of the short circuit protection conductive piece 5 is welded with, riveted with, screwed with or adhered with the cap plate 2, the other end of the short circuit protection conductive piece 5 is welded with, riveted with, screwed with or adhered with the second terminal unit 7, so that the short circuit protection conductive piece 5 can be electrically connected to the cap plate 2 and the second terminal unit 7 simultaneously.

The safety reverse valve 6 is welded with the cap plate 2, specifically, the safety reverse valve 6 can be sealed and assembled to a hole 8 provided on the cap plate 2 by laser welding, the safety reverse valve 6 has a deformable pressure of 0.3 MPa~0.5 MPa, is not break at a pressure of 0.7 MPa, and has a deformable height of not less than 0.5 mm. The safety reverse valve 6 is provided with a notch 9, a depth of the notch 9 is 0.05 mm~2 mm, generally, the depth of the notch 9 is about 0.25 mm, because adjustment on this depth can improve the deformable pressure, a periphery of the safety reverse valve 6 provided with the notch 9 is fixedly connected to an edge of the hole 8 of the cap plate 2, the deeper the notch 9 is, the lower deformable pressure the safety reverse valve 6 has.

Normally, the safety reverse valve 6 is not in contact with the short circuit protection conducting plate 5; when the power battery is involved in an accident, an internal pressure of the battery rises, when the internal pressure reaches the deformable pressure of the safety reverse valve 6, the safety reverse valve 6 acts and contacts the short circuit protection conducting plate 5, so as to realize the external short circuit of the power battery. The first terminal unit 1 and the second terminal unit 7 control the current via a resistance provided therein, so as to control heat quantity, protect the safety reverse valve 6 from melting through, and achieve the effect of protecting the safety reverse valve 6. In this way, on the one hand, it can be ensured that an overcharge current is eliminated, on the other hand, the energy in the power battery as potential dangerous resource can be released, and safety hazards can be eliminated.

According to disclosure and teaching of the foregoing descriptions of the present disclosure, appropriate variations and modifications of the above embodiments can occur to a person skilled in the art. Therefore, the present disclosure is not limited to the specific embodiments disclosed and described in the above, any obvious improvements, modifications and variations made based on the present disclosure by a person skilled in the art will also belong to the scope of the appended claims. Furthermore, although specific terminologies are used in the present disclosure, these terminologies are merely for convenience of description, and the present disclosure is not limited to that.

What is claimed is:

1. A safety cap assembly of power battery, comprising a cap plate and a first terminal unit, a second terminal unit, a vent, an electrolyte-injection hole and a safety reverse valve which are provided to the cap plate;

the first terminal unit being electrically connected to the cap plate;

the second terminal unit being insulated from and assembled to the cap plate;

the safety reverse valve being electrically connected to the cap plate;

a short circuit protection conducting plate being provided above the cap plate, the short circuit protection conducting plate being electrically connected to the second terminal unit, the short circuit protection conducting plate being positioned above the safety reverse valve;

the first terminal unit comprising a first terminal body, and a metal gasket and a resistance plate which are provided around the first terminal body, the resistance plate being provided below the metal gasket, the resistance plate comprising a substrate and a coating on a surface of the substrate;

wherein the coating is used to adjust a resistance of the resistance plate;

the coating is a high temperature-resistance composite material composed of inorganic and organic polymers;

the thickness of the coating is 200 μm~300 μm; and the resistance of the resistance plate is 50 mohm~130 mohm.

2. The safety cap assembly of power battery according to claim 1, wherein the resistance plate is positioned between the first terminal body and the cap plate, and the first terminal body is electrically connected to the cap plate via the resistance plate.

3. The safety cap assembly of power battery according to claim 1, wherein a shape of the resistance plate is provided as a square, a circle or an ellipse.

4. The safety cap assembly of power battery according to claim 1, wherein one end of the short circuit protection conductive piece is welded with, riveted with, screwed with or adhered with the cap plate, the other end of the short circuit protection conductive piece is welded with, riveted with, screwed with or adhered with the second terminal unit.

5. The safety cap assembly of power battery according to claim 1, wherein the safety reverse valve is welded with the cap plate.

6. The safety cap assembly of power battery according to claim 1, wherein the safety reverse valve is provided with a notch, a depth of the notch is 0.05 mm~2 mm.

* * * * *